United States Patent
Tsai

[19]

[11] Patent Number: 5,971,278
[45] Date of Patent: Oct. 26, 1999

[54] METHOD OF ALIGNMENT FOR MULTI-CCD AND THE APPARATUS OF THE SAME

[75] Inventor: Jenn-Tsair Tsai, Yang Mei Chen, Taiwan

[73] Assignee: Mustek Systems Inc., Taiwan

[21] Appl. No.: 08/914,232

[22] Filed: Aug. 19, 1997

[51] Int. Cl.[6] .................................................. G06K 7/10
[52] U.S. Cl. ............................. 235/462.25; 235/462.41
[58] Field of Search .......................... 235/462.11, 462.01, 235/462.1, 462.24, 462.25, 462.26, 462.27, 462.28, 462.29, 462.81, 439, 454

[56] References Cited

U.S. PATENT DOCUMENTS

| | | | |
|---|---|---|---|
| 5,124,537 | 6/1992 | Chandler et al. | 235/462.11 |
| 5,396,054 | 3/1995 | Krichever et al. | 235/462.11 |
| 5,536,930 | 7/1996 | Barkan et al. | 235/439 |
| 5,691,773 | 11/1997 | Wang et al. | 235/462.11 |
| 5,717,221 | 2/1998 | Li et al. | 235/462.11 |
| 5,736,724 | 4/1998 | Ju et al. | 235/462 |
| 5,844,226 | 12/1998 | Suzuki et al. | 235/462 |

*Primary Examiner*—Thien Minh Le
*Attorney, Agent, or Firm*—Pennie & Edmonds LLP

[57] ABSTRACT

The present invention includes an alignment pad set in front of a plurality of charge couple devices. The alignment pad includes a plurality of alignment patterns formed on the pad. The signals detected by the CCDs are respectively fed to a multi-processor. The multi-processor is used to determine which CCD's signal can be fed into next element. A correlated double sampling (CDS) is used to respond the detected signal and adjust dc gain of the detected signal, therefore generating adjusted image signal. A 3 to 1 R, G, B multi-processor is connected to the CDS. An analogue to digital converter is respond the 3 to 1 R, G, B multiprocessor to convert adjusted image signal to a digital signal. Then, the image data is fed into an application specific integrated circuits (ASIC) to generate a plurality of collation datas.

12 Claims, 4 Drawing Sheets

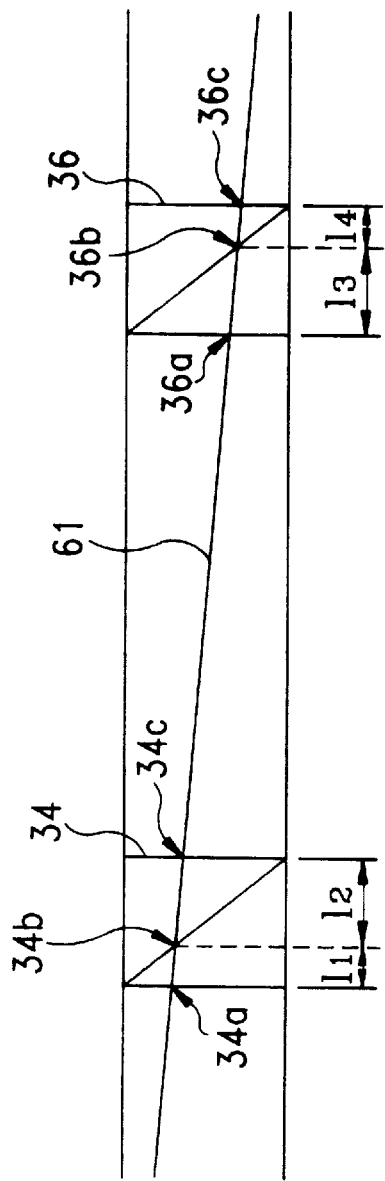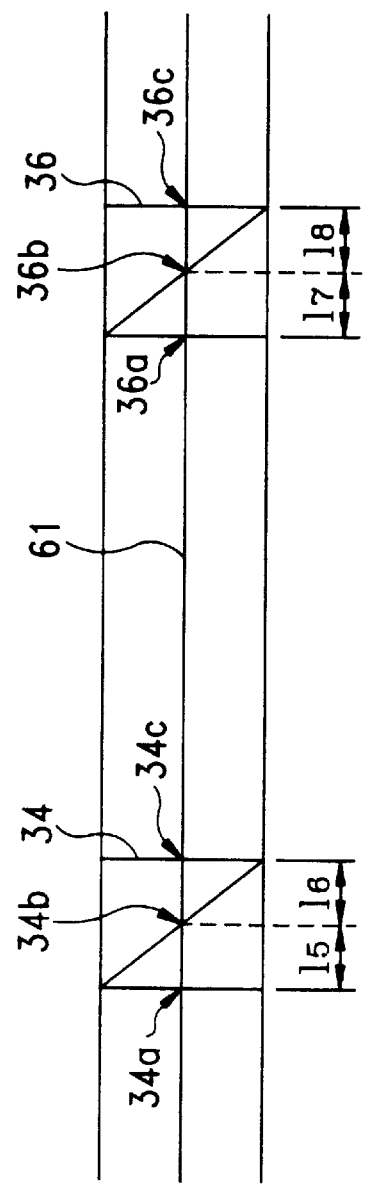
FIG.6A
FIG.6B

METHOD OF ALIGNMENT FOR MULTI-CCD AND THE APPARATUS OF THE SAME

FIELD OF THE INVENTION

The present invention relates to a method, apparatus of alignment and adjustment for a scanning system, and more specifically, to a adjustment, alignment apparatus and method for a multi-CCD used in a scanning system.

BACKGROUND OF THE INVENTION

Conventional scanning system can be approximately divided into two segments that are handy scanning system and flat-bed scanning system. A scanning system makes use of focusing a reflecting light beam through a photodetector to generate an image signal for further image processing. A conventional scanning system apparatus includes a light source, a mirror, and a lens set, which are used to guide the reflecting light to a charge couple device (CCD). The charge couple device is utilized to generate an image signal. Typically, image capture is achieved by passing the document in front of a device known as a CCD. This consists of a large of very small, individual semiconductor receptors, disposed in a linear array. The document is passed in front of the CCD and a complete image of the document linear segments individually captured from the CCD. A pre-processing element is used to respond an image signal and adjust dc gain of the image signal. An analogue to digital converter is used to convert adjusted image signal to a digital signal and a post-processing element to generate an image code by processing said digital signal through highlight, shadow, and Gamma correction.

Conventional scanning system includes one CCD for capturing the image of a document. However, it only can be used to scan a document with small size, such as the A4 size. In order to scan a document having more larger area than A4 size, the space between the CCD and the document has to be increased. It has some drawbacks for this arrangement. For example, the size of the scanning system is increased, which can not meet the trend of scaling down the size of the scanning system. Further, the resolution and the scanning time of the scanning system are both degraded due to the space between the CCD and the document is increased.

Therefore, what is required is a scanning system having multi-CCD to scan a document with larger area, and the alignment, adjustment method of the multi-CCD for the multi-CCD scanning system.

SUMMARY OF THE INVENTION

A scanning system includes a plurality of CCDs for capturing the image of an object. An alignment pad are set in front of the CCDs. The alignment pad includes a plurality of alignment patterns formed on the pad. The alignment patterns consist of an oblique line and two vertical lines, respectively. The oblique line is tilted with 45 degree respect to horizontal line. Two vertical lines is respectively connected to the ends of the oblique line. Thus, the alignment patterns are similar to the character "N". Alternatively, the alignment pattern 32–36 consisting of only one vertical line and one oblique line can also be used in the present invention. The distances between each alignment patterns are equal.

The signals detected by the CCDs are respectively fed to a 2 to 1 multi-processor. The multi-processor is used to determine which CCD's signal can be fed into next element. A pre-processing element, for example, correlated double sampling (CDS) is used to respond the detected signal and adjust dc gain of the detected signal, therefore generating adjusted image signal. A 3 to 1 R, G, B multiprocessor is connected to the CDS. An analogue to digital converter is respond the 3 to 1 R, G, B multiprocessor to convert adjusted image signal to a digital signal. Then, the digital signals is fed to a post-processing element to generate an image data by processing said digital signal through highlight, shadow, and Gamma correction. Then, the image data is fed into an application specific integrated circuits (ASIC) to generate a plurality of collation datas. Subsequently, the collation datas is fed into the host computer for collation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 6A, B are the drawings illustrating the second CCD scanning on the alignment pad, respectively.

DESCRIPTION OF THE PREFERRED EMBODIMENT

The present invention discloses an alignment method of a multi-CCD scanning system. With the multi-CCD scanning system, the scanning system can scan a document larger than A4 size, for example 36 inches size area. The description of the present invention will be seen as follows.

Figure 1:
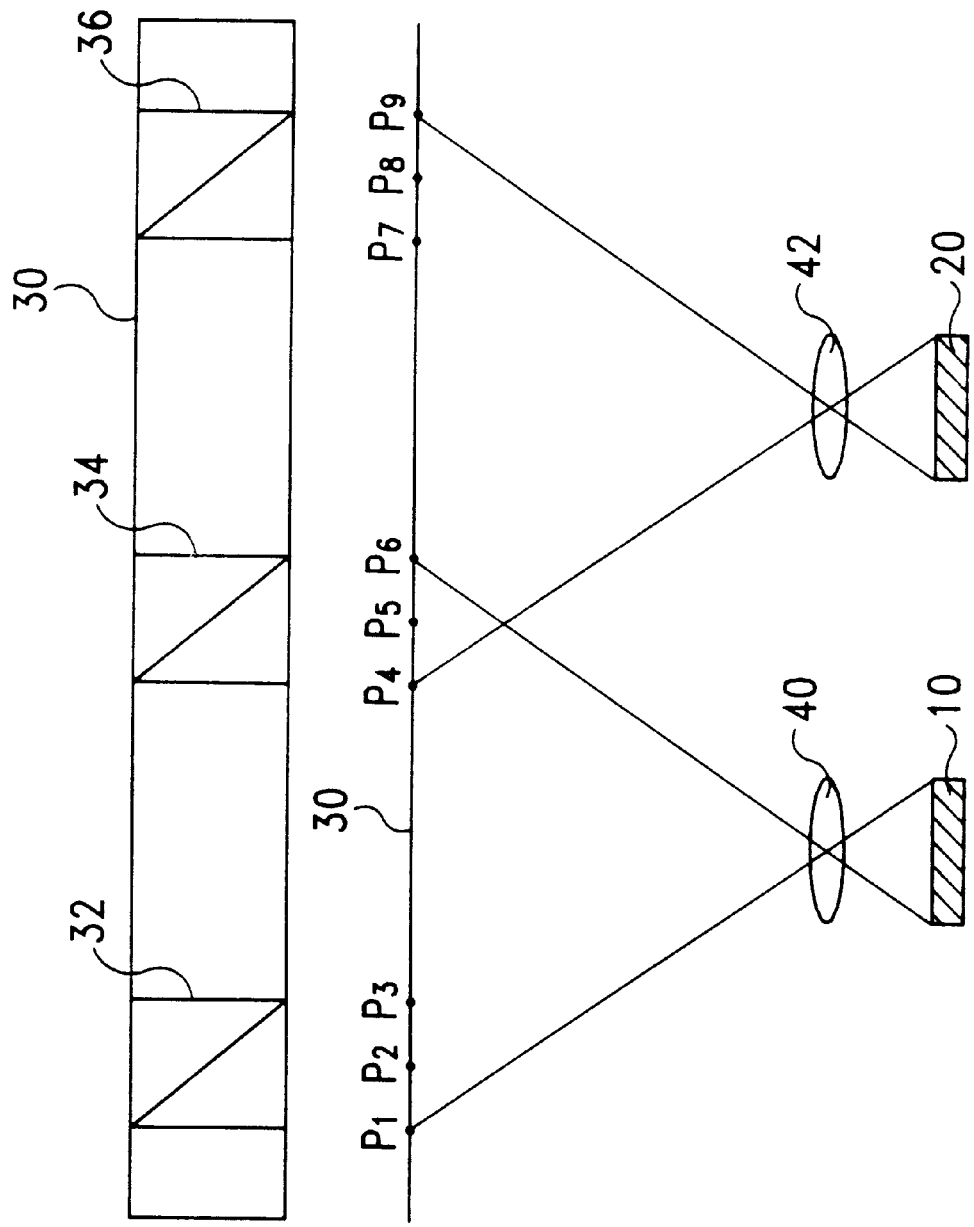
FIG. 1 is a schematic drawing of the alignment arrangement according to the present invention.

Turning to FIG. 1, a scanning system includes a plurality of CCDs for capturing the image of an object, for example a document. In an embodiment, a first CCD 10 and a second CCD 20 are set in line in a scanning system. An alignment pad 30 are set in front of the CCDs 10, 20. The position where the alignment pad 30 located is used for placing the document when the document is fed into the scanning system for scanning. A plurality of lens are set between the alignment pad 30 and the CCDs 10, 20. For example, lens 40, 42 are set in front to the CCDs 10, 20, respectively.

Figure 2:
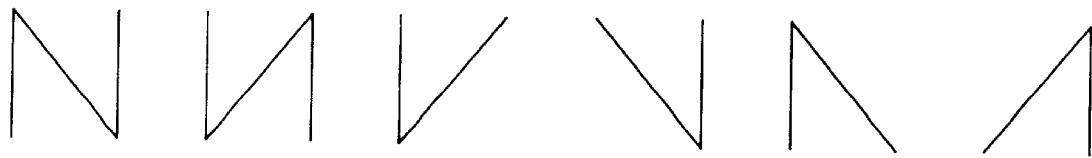
FIG. 2 is a schematic drawing of the alignment patterns according to the present invention.

In order to describe the present invention in detail, the pattern of the alignment pad 30 is shown on the top of FIG. 1. The alignment pad 30 includes a plurality of alignment patterns formed on the pad 30. The number of the alignment patterns depends on the number of the CCD. In the case, a first, a second and a third alignment patterns 32, 34, 36 are formed on the alignment pad 30 corresponding to the CCDs 10, 20. The alignment patterns 32–36 consist of an oblique line and two vertical lines, respectively. The oblique line is tilted with about 45 degrees respect to horizontal line. Two vertical lines is respectively connected to the ends of the oblique line. Thus, the alignment patterns 32–36 are similar to the letter "N". Alternatively, the alignment pattern 32–36 consisting of only one vertical line and one oblique line can also be used in the present invention. The distances between each alignment patterns are equal. FIG. 2 shows the schematic of the alignment patterns according to the present invention.

Still referring to FIG. 1, P1 to P9 are reference marks on the alignment pad 30. The length of alignment pad 30 is longer than the length between PI and P9. The maximum size of a scanned document is equal to the length between P2 and P8, for example, 36 inches. Assume that the resolution (dpi) of the CCD is 400 pixels per inch. Therefore, the numbers of the pixels on the document is 14400. Further, the first CCD 10 can detect the image within the area between PI and P6. Similarly, the second CCD 20 can detect the image within the area between P4 and P9. The area between P4 to P6 is overlap zone where can be detect by the first CCD 10 and the second CCD 20.

P1, P3, P4, P6, P7, P9 are aligned to the vertical lines of the above alignment patterns 32–36 respectively. P2 is aligned to the midpoint of the oblique line of the alignment pattern 32. Similarly, P5 and P8 are respectively aligned to the midpoints of the alignment patterns 34, 36. The document are divided into a plurality of sections, in this case, two sections. The two sections are scanned by the first CCD 10 and the second CCD 20, respectively. The first section is the area between P2 to P6, while the second section is from P4 to P8. Three reference marks are aligned to each alignment pattern. If the alignment pattern is consisted of one vertical line and one oblique line, then the number of the reference mark corresponding to the alignment pattern are two.

Figure 3:
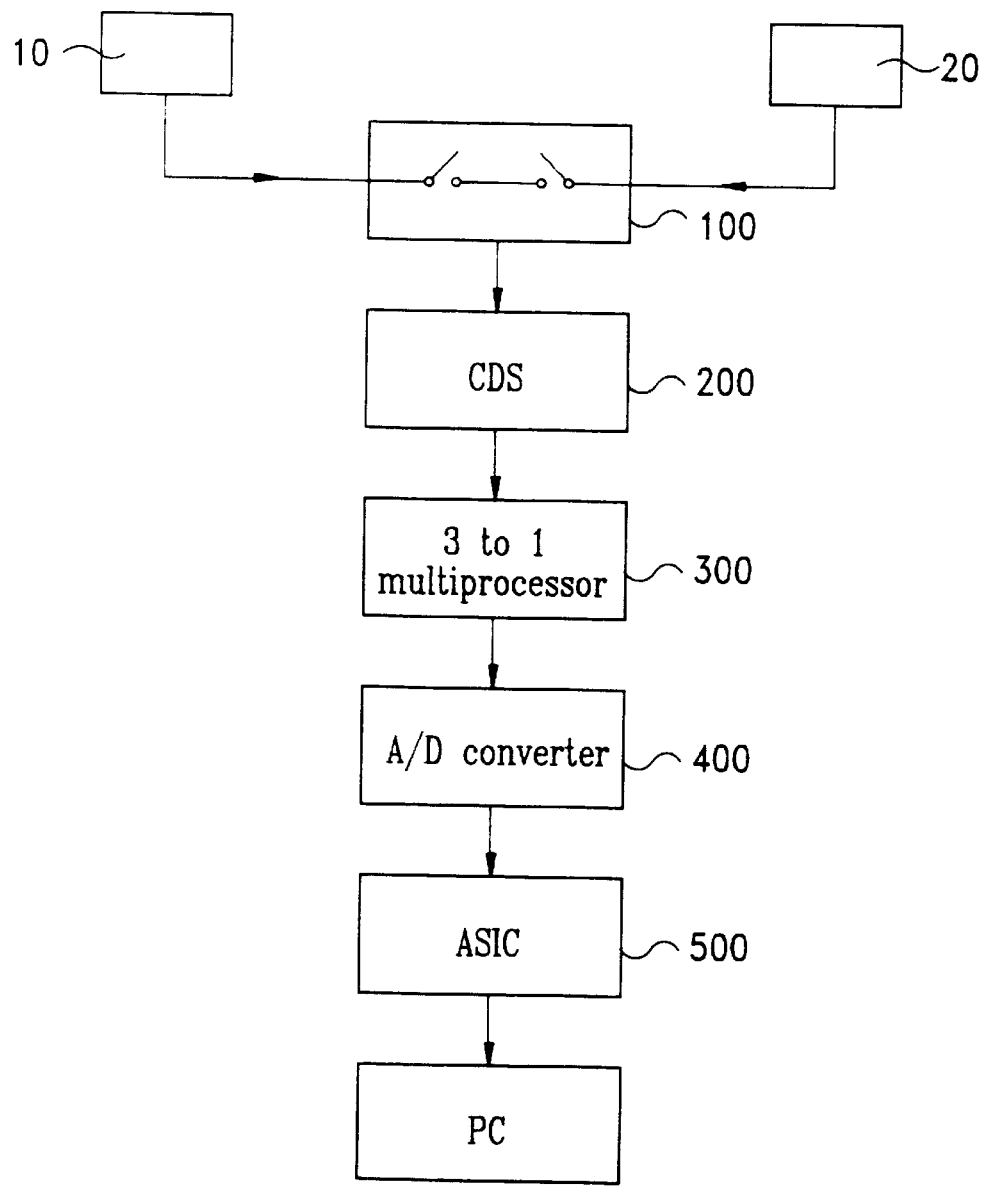
FIG. 3 is a schematic drawing of the alignment method according to the present invention
Figure 4:
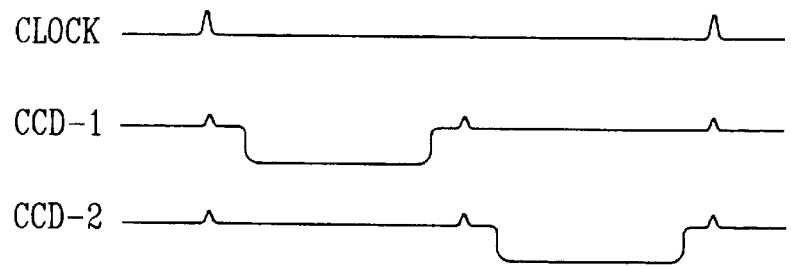
FIG. 4 is an example of the timing diagram for the multiprocessor according to the present invention.

Turning to FIG. 3, it shows the method of the present invention. The signals detected by the CCD 10 and CCD 20 are respectively fed to a 2 to 1 multi-processor 100. The multi-processor 100 is well known in the art, which can be used to determine which CCD's signal can be fed into next element. FIG. 4 is the timing diagram for the multi-processor 100. A pre-processing element, for example, correlated double sampling (CDS) 200 is used to respond the detected signal and adjust dc gain of the detected signal, therefore generating adjusted image signal. In the other words, the CDS 200 is connected to the multi-processor 100 to amplify and adjust the offset of the detected signal. A 3 to 1 R, G, B multiprocessor 300 is connected to the CDS 200. The 3 to 1 R, G, B multiprocessor 300 is used to select the R, G, B signals in sequence and fet them to subsequent elements. An analogue to digital converter 400 is respond the 3 to 1 R, G, B multiprocessor 300 to convert adjusted image signal to a digital signal. Then, the digital signals is fed to a post-processing element to generate an image data by processing said digital signal through highlight, shadow, and Gamma correction. Then, the image data is fed into an application specific integrated circuits (ASIC) 500 to generate a plurality of collation datas. Subsequently, the collation datas is fed into the host computer 600.

Figure 5A:
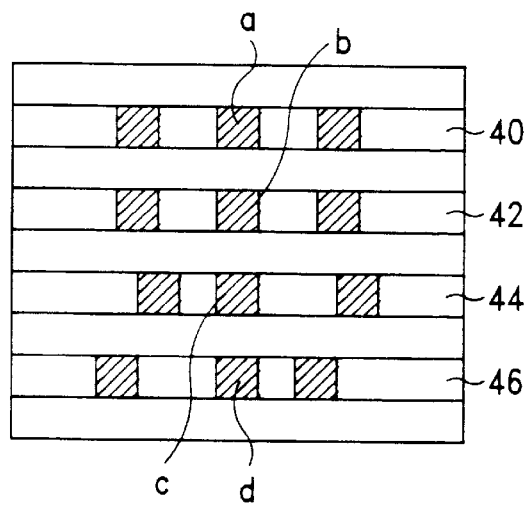
FIG. 5A is the collation datas before alignment according to the present invention.
Figure 5B:
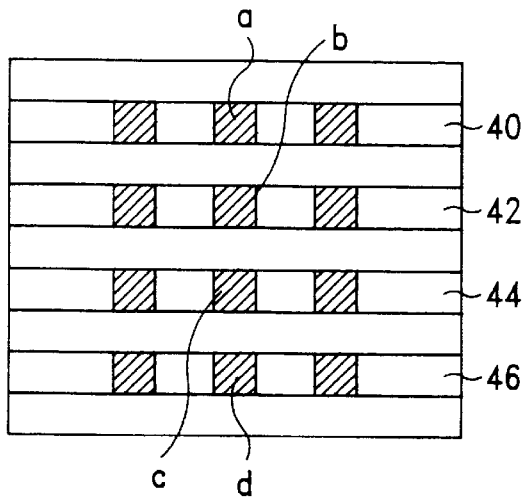
FIG. 5B is the collation datas after alignment according to the present invention.

The CCDs 10, 20 send the signal per 0.1 second to the host computer 600 via firmware. The host computer 600 is responsive to these signal, then displays the collation datas on a monitor in gray mode for collation. In order to adjust and collect the collation datas, the image of the alignment patterns scanned by the CCDs are displayed on the monitor one by one from up portion to bottom portion, as shown in FIGS. 5A, 5B. FIG. 5A is the collation datas before alignment according to the present invention. FIG. 5B is the collation datas after alignment according to the present invention. The collation data 40 indicates that the alignment pattern 32 scanned by the first CCD 10. The collation data 42 indicates that the alignment pattern 34 is scanned by the first CCD 10. The collation data of the alignment pattern 34 scanned by the second CCD 20 is denoted by 44. The collation data 46 indicates that the alignment pattern 36 scanned by the second CCD 20.

In FIG. 5A, the collation data 44 and the collation data 46 are not aligned with each other. Further, the collation dates 44, 46 also shift to other collation datas. It means that the second CCD 20 is not set in the precise position. Therefore, the method can determine which CCD is not aligned to the alignment pad 30. Assume that the second CCD 20 is shift as shown in the FIG. 6A, which is cprrespondance to FIG. 5A. The line 61 indicates the region that is scanned by the second CCD 20. In the FIG. 6A, the line 61 is oblique instead of horizontal. The distance 11 between the 34a and 34b is different from the distance 12 betweent the 36a and 36b. The distance 13 between the 34b and 34c is not equal to the distance 14 between the 36b and 36c. Thus, the CCD need to be adjusted its position. First, to adjust the CCDs 10, 20 such that the a, b, c, d of the collation data 40, 42, 44, 46 can be in line. Then, the CCD 10, 20 is adjusted for horizontal alignment, respectively.

After the alignment of the CCDs, the image of the alignment patterns scanned by the CCDs on the monitor are shown in FIG. 5B. It can be seen in FIG. 6B, The distance 15 between the 34a and 34b is equal to the distance 16 between the 34b and 34c. So are the distance 17 between the 36a and 36b and the distance 18 between the 36b and 36c. The operator can adjust the CCDs one by one by using above method, respectively.

The foregoing description of the present invention has been presented for purposes of illustration and description. As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An alignment apparatus for a scanning system having a plurality of charge coupled devices, said apparatus comprising:

a multiprocessor connected to said plurality of charge coupled devices;

a correlated double sampling (CDS) connected to said multiprocessor, wherein said multiprocessor is used to determine which signal detected by said charge coupled devices is fed into said correlated double sampling, said correlated double sampling responsive to said detected signal and adjusting dc gain of said detected signal for generating adjusted signal;

an analogue to digital converter responsive to said correlated double sampling to convert adjusted signal to a digital signal;

a post-processing element connected to said analogue to digital converter to generate an image data by processing said digital signal through highlight, shadow and Gamma correction;

an application specific integrated circuits (ASIC) connected to said post-processing element for generating a plurality of collation datas; and an alignment pad set in front of said charge coupled devices for aligning said charge coupled devices.

2. The apparatus of claim 1, wherein said alignment pad further comprising:

a plurality of alignment patterns formed on said alignment pad, distances between each of said alignment patterns being equal such that said charge couple devices detecting at least one of said alignment patterns.

3. The apparatus of claim 2, wherein said alignment pattern comprises a first oblique line tilted at a first degree with respect to a horizontal line, first and second vertical lines being respectively connected to two ends of said first oblique line.

4. The apparatus of claim 3, wherein said first degree is about 45 degrees.

5. The apparatus of claim 2, wherein said alignment pattern comprises a first oblique line tilted at a first degree with respect to a horizontal line, a first vertical line being connected to one end of said first oblique line.

6. The apparatus of claim 5, wherein said first degree is about 45 degrees.

7. The apparatus of claim 1, further comprising a monitor for displaying said plurality of collation datas.

8. A method of alignment of a plurality of charge couple devices for a scanning system, said scanning system comprising:

setting an alignment pad having a plurality of alignment pattern in front of said a plurality of charge couple devices, distances between each of said alignment patterns being equal such that said charge couple devices detecting at least one of said alignment patterns;

generating image signal of said a plurality of alignment pattern using said a plurality of charge couple devices scanning said alignment patterns; and generating collation datas by responsive to said image signal for collation.

9. The method of claim 8, wherein said alignment pattern comprises a first oblique line tilted at a first degree with respect to a horizontal line, first and second vertical lines being respectively connected to two ends of said first oblique line.

10. The method of claim 9, wherein said first degree is about 45 degrees.

11. The method of claim 8, wherein said alignment pattern comprises a first oblique line tilted at a first degree with respect to a horizontal line, a first vertical line being connected to one end of said first oblique line.

12. The method of claim 1, wherein said first degree is about 45 degrees.

* * * * *